Figure 1:
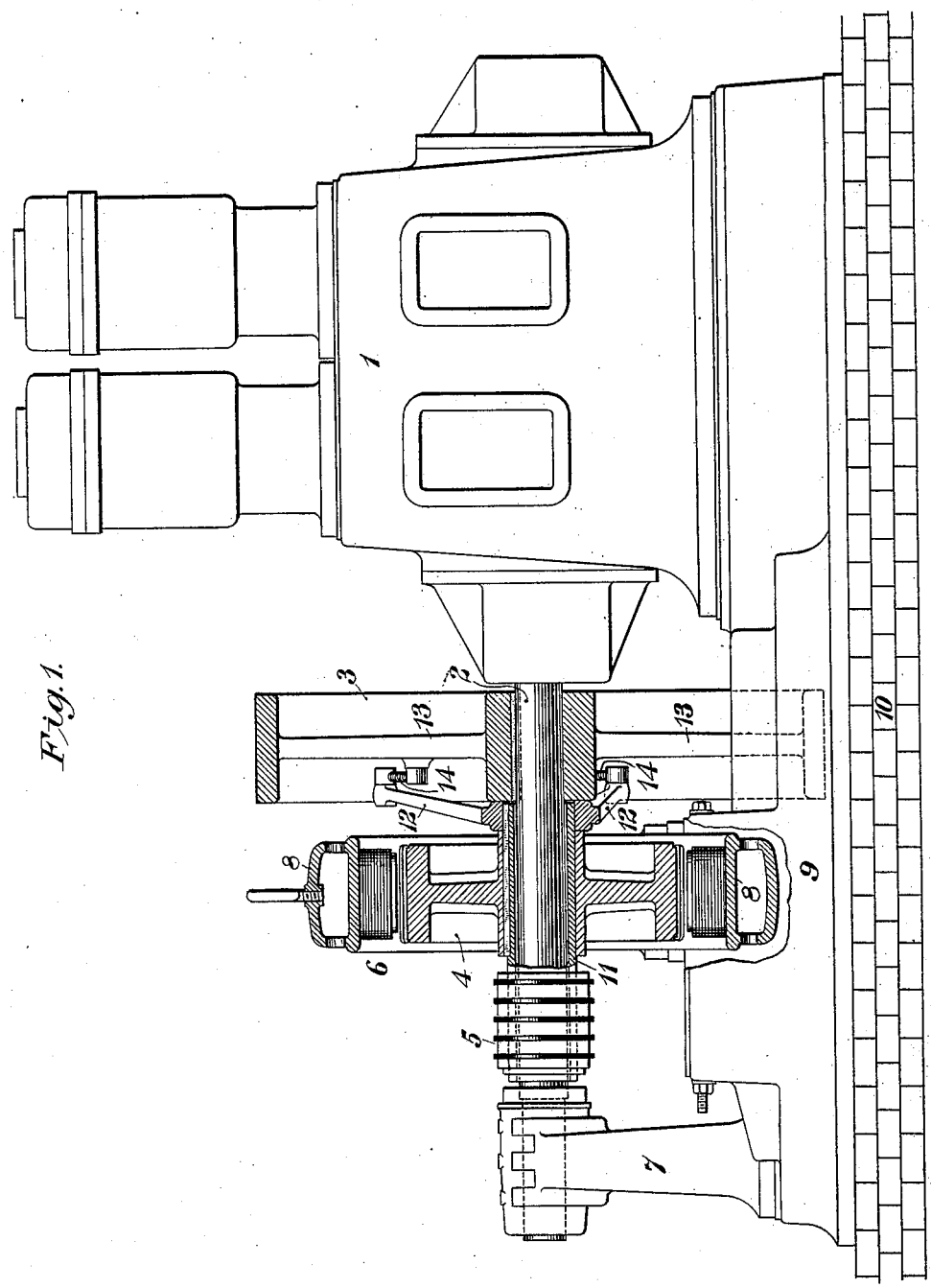

No. 757,436. PATENTED APR. 19, 1904.
W. A. BOLE.
ELECTRICAL GENERATING SYSTEM.
APPLICATION FILED JULY 12, 1901.
NO MODEL. 2 SHEETS—SHEET 1.

WITNESSES:
C. L. Belcher
Birney Hines

INVENTOR
Wm. A. Bole
BY Wesley G. Carr
ATTORNEY.

No. 757,436. PATENTED APR. 19, 1904.
W. A. BOLE.
ELECTRICAL GENERATING SYSTEM.
APPLICATION FILED JULY 12, 1901.
NO MODEL. 2 SHEETS—SHEET 2.
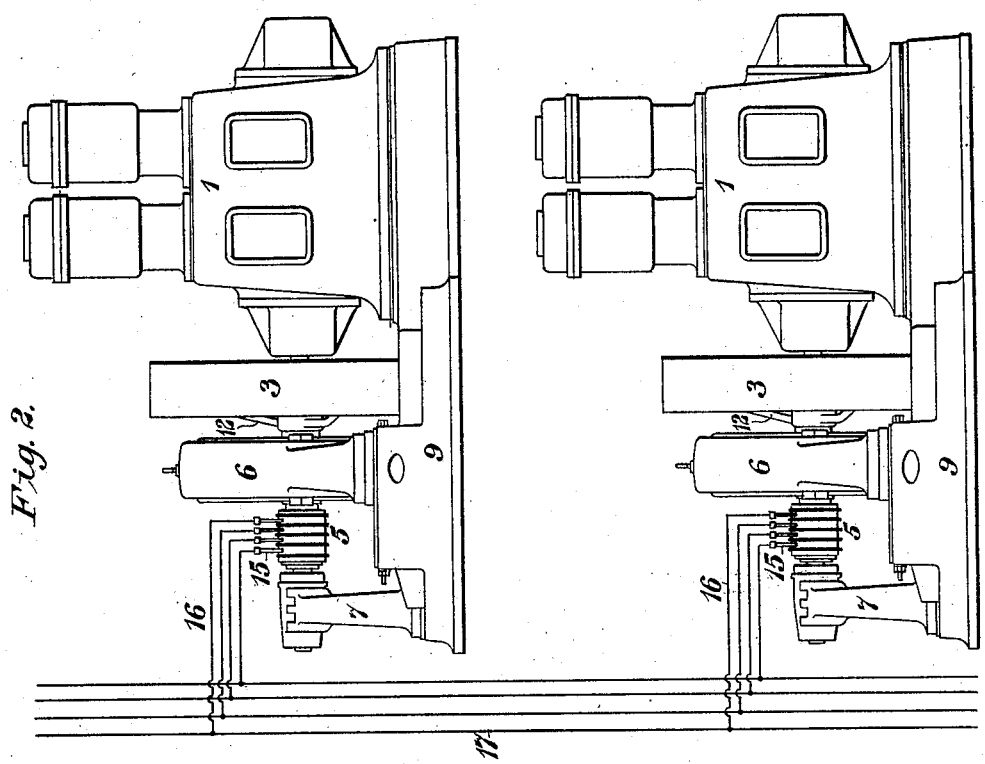
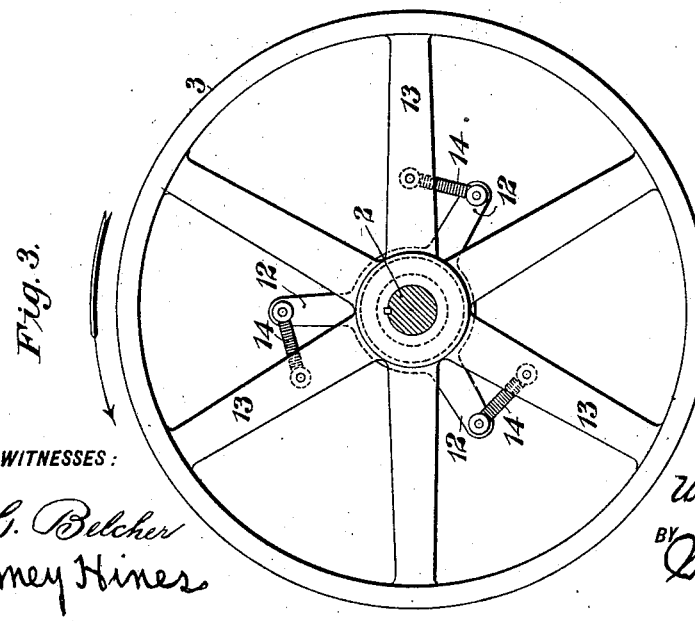
WITNESSES:
C. L. Belcher
Birney Hines
INVENTOR
Wm. A. Bole
BY
Wesley G. Carr
ATTORNEY.

No. 757,436.                                              Patented April 19, 1904.

UNITED STATES PATENT OFFICE.

WILLIAM A. BOLE, OF PITTSBURG, PENNSYLVANIA, ASSIGNOR TO THE WESTINGHOUSE MACHINE COMPANY, A CORPORATION OF PENNSYLVANIA.

ELECTRICAL GENERATING SYSTEM.

SPECIFICATION forming part of Letters Patent No. 757,436, dated April 19, 1904.

Application filed July 12, 1901. Serial No. 68,048. (No model.)

*To all whom it may concern:*

Be it known that I, WILLIAM A. BOLE, a citizen of the United States, residing at Pittsburg, in the county of Allegheny and State of Pennsylvania, have invented a new and useful Improvement in Electrical Generating Systems, of which the following is a specification.

My invention relates to systems of and apparatus for generating electricity, and particularly to such systems as embody a plurality of dynamo-electric generators electrically connected in parallel and independently driven by fluid-pressure engines that are directly connected thereto.

The object of my invention is to provide means whereby two or more generators which are directly connected to their driving-engines and are operated to supply energy in parallel to the same circuit may be maintained in synchronism.

In the operation of alternating-current generators in parallel difficulties have usually been experienced by reason of their tendency to depart from synchronous operation, and thus to effect serious disturbances in the distributing-circuits and in the translating devices supplied thereby. This difficulty has been especially pronounced where generators of large size have been independently driven by engines to which they were directly connected. The primary cause of departure from synchronism in machines of the character indicated is the variation from constant speed of a reciprocating driving-engine during the rotation of its shaft. If the driving-engine has only one crank and is double acting, there are two points in each rotation at which its fly-wheel will lose in angular speed and two points in the rotation at which it will gain in angular speed. Variations from uniform speed are regulated and kept within determinable limits by means of a fly-wheel, the mass and diameter of which determine the amount of gain or loss due to variations in the propelling force. If the engine has two or more cranks, the amount of deviation from uniform speed may be reduced to a greater degree than in a single-crank engine; but it cannot be wholly eliminated. In the case of two engines that are directly coupled to two generators and are running in step as regards the reciprocating parts of the engines and also as regards the polar relations of the generators the output of energy from the generators may be variable only within small limits, since each generator is affected as regards the rotation of its shaft in the same way and to the same degree. It is not always possible, however, to insure the operation of engines in such manner that their pistons shall move in unison, and any variations from such operation tend to effect inequality in the polar relations of the generators, so that they do not at all points in a revolution produce currents of like potential. Cross-currents between the generators are thus liable to be produced to such an extent as to reduce the efficiency of the machines and disturb the operation and reliability of the service generally.

The variations in the angular velocity above pointed out are likely to result in an alternation of effects as regards the two generators, whereby first one and then the other is in the lead as regards its polar relations, the action being of a pendulous character, which becomes magnified in its extent and varied in its relations, according to the masses to be moved. This pendulous action may so react on the speed of the engines as to affect the positions of the engine-governors, which in turn vary the amount of steam supplied to the engines, and thus produce still greater divergence in angular speed.

The electromagnetic interrelations of the generators have a tendency to correct the defects above indicated; but such tendency is not infrequently insufficient to hold the units in synchronism. The generator which is for the instant in advance of the other may and often does operate the other generator as a motor, and under such circumstances the governor of the engine which is connected to the generator acting as a motor is liable to accentuate the evil instead of serving to correct it.

In order to maintain such conditions as will insure synchronous operation of direct-connected generators which are connected in parallel, I propose to mount one of the members of each generator loosely upon its support and connect it flexibly to such support by means of suitable springs or their equivalents, so that the magnetic relations which tend to keep the various armatures in correct relation with reference to the field-magnet poles may act upon the relatively small masses represented by the flexibly-supported members instead of being called upon to act upon the greater masses of the fly-wheels and reciprocating parts. With this construction and arrangement the magnetic action will be free to effect a quick angular adjustment of the flexibly-mounted members, either forward or backward in accordance with the relative positions of the rotating members of the generating units, and at the same time the fly-wheels will effect their normal functions of steadying the actions of the engines.

I have illustrated my invention in the accompanying drawings, in which—

Figure 1 is a view, partially in side elevation and partially in section, of an engine and an electric generator, the armature of which is connected to the shaft of the engine by means of flexible connections, parts of the mechanism being omitted. Fig. 2 is a side elevation of two direct-connected generators and engines and a diagram of a two-phase circuit to which the generators are connected in parallel. Fig. 3 is a detail side elevation of an engine fly-wheel, showing the means of connection between the same and the rotatable member of the generator.

The engine 1, which may be either a steam or gas engine, is provided with a shaft 2, that is extended at one side of the engine to receive a fly-wheel 3, the latter being suitably keyed to the shaft, and also to support the armature 4 and collector-rings 5 of an alternating-current generator 6, the extreme end of the shaft being mounted in suitable bearings on a standard or pillar 7. The engine 1, field-magnet frame 8, and shaft-supporting pillar 7 are all mounted upon a bed-plate 9, which is in turn supported by a suitable masonry foundation 10.

The armature 4 and collector-rings 5 are here shown as keyed or otherwise fastened to a sleeve 11, which is free to turn upon and independently of the shaft 2. Between the fly-wheel 3 and the generator 6 the sleeve 11 is provided with a plurality of arms 12, three being shown in the drawings, the inner ends of which are rigidly fastened to the sleeve and the outer ends of which are connected to three of the spokes 13 of the fly-wheel 3 by means of coil-springs 14.

The particular means for making flexible connection between the rotatable member of the generator and the shaft of the engine may obviously be varied from what is shown, the latter being merely indicative of suitable means whereby the movable members of the machines are permitted to respond readily to corrective magnetic pulls independently of the fly-wheels.

Any number of generators and engines may be thus employed for supplying energy to the same electric circuit in parallel, since the conditions which obtain in such relations are not affected by the number of machines, provided there be more than one.

In Fig. 2 the collector-rings 5 are shown as provided with four brushes 15, from which conductors 16 lead to the bus-bars 17 of the system.

My invention is equally applicable to installations in which the stationary member is the armature and the rotating member the field-magnet, and it may also be employed in cases where the rotating member of the generator is rigidly secured to the engine-shaft of the fly-wheel, provided the stationary member of the generator is so mounted as to be free to oscillate around its axis within limits, and has such a resilient connection to its support as will permit it to be adjusted so as to secure the proper polar relation between it and the rotating member of the machine. It will be also understood that less than the whole number of generating units may be provided with means whereby one of the members of the dynamo is adapted for angular adjustment about the shaft without sacrificing the advantages of my invention, and I therefore do not desire to limit the scope of the invention to a special construction for all of the units of an installation.

I claim as my invention—

1. The combination with an engine and a dynamo-electric machine having its rotating member mounted upon the engine-shaft, of a flexible, resilient connection between one of the members of the dynamo and its support whereby it is free to move around its axis independently of said support, within defined limits, in either direction.

2. The combination with a plurality of engines and a plurality of electric generators each of which has its rotating member mounted upon the corresponding engine-shaft, of a flexible, resilient connection between one of the members of each generator and its support whereby said members are permitted to move around their axes, within defined limits, in either direction to maintain synchronism of the generators.

3. The combination with a plurality of engines and a plurality of electric generators the rotating member of each of which is mounted upon the corresponding engine-shaft, of flexible, resilient connections between the rotatable member of each generator and the shaft of its engine whereby said rotatable members may move around their axes in either direction, within defined limits, to maintain synchronous relation.

4. The combination with a plurality of engines and a plurality of electric generators connected in parallel to the same circuit and each having its rotating member mounted upon the corresponding engine-shaft, of flexible, resilient connections between the rotatable member of each generator and the engine fly-wheel, whereby synchronous operation may be maintained.

5. The combination with a plurality of engines and a plurality of electric generators connected in parallel to the same circuit, the rotating member of each generator being mounted upon the corresponding engine-shaft, of flexible, resilient connections between the rotatable member of each generator and the engine-shaft whereby synchronous operation of the generators may be maintained.

In testimony whereof I have hereunto subscribed my name this 10th day of July, 1901.

WILLIAM A. BOLE.

Witnesses:
W. D. CRUMPTON,
JAMES B. YOUNG.